US012236507B2

United States Patent
Natori (10) Patent No.: US 12,236,507 B2
(45) Date of Patent: Feb. 25, 2025

(54) IMAGE EDITING SUPPORT METHOD AND IMAGE EDITING SUPPORT DEVICE

(71) Applicant: SEIKO EPSON CORPORATION, Tokyo (JP)

(72) Inventor: Takashi Natori, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 93 days.

(21) Appl. No.: 17/944,282

(22) Filed: Sep. 14, 2022

(65) Prior Publication Data

US 2023/0084108 A1 Mar. 16, 2023

(30) Foreign Application Priority Data

Sep. 14, 2021 (JP) .................. 2021-149260

(51) Int. Cl.
*G06T 11/60* (2006.01)
*G06T 11/20* (2006.01)

(52) U.S. Cl.
CPC .............. *G06T 11/60* (2013.01); *G06T 11/20* (2013.01)

(58) Field of Classification Search
CPC .................. G06T 11/60; G06T 11/20
See application file for complete search history.

(56) References Cited

U.S. PATENT DOCUMENTS

| | | | |
|---|---|---|---|
| 2010/0246996 A1 | 9/2010 | Yamamoto | |
| 2012/0154430 A1 | 6/2012 | Matsushima et al. | |
| 2016/0188178 A1* | 6/2016 | Wang | G06F 3/04842 |
| | | | 715/845 |
| 2020/0394773 A1* | 12/2020 | Wilensky | G06F 3/0484 |
| 2022/0084279 A1* | 3/2022 | Lindmeier | G06F 3/012 |

FOREIGN PATENT DOCUMENTS

| | | |
|---|---|---|
| JP | 2010-238019 A | 10/2010 |
| JP | 2010-238135 A | 10/2010 |
| JP | 2012-133490 A | 7/2012 |

* cited by examiner

*Primary Examiner* — Said Broome
*Assistant Examiner* — Andrew Shin
(74) *Attorney, Agent, or Firm* — Dority & Manning, P.A.

(57) ABSTRACT

An image editing support method includes deciding a target object as a first object at least partially overlapping a range to be filled with a blank in a first image in which at least one first object representing at least one of a character and a diagram is arranged out of the at least one first object when an operation of designating the range is performed using a pointer, and moving the target object to an outside of the range.

3 Claims, 6 Drawing Sheets

IMAGE EDITING SUPPORT METHOD AND IMAGE EDITING SUPPORT DEVICE

The present application is based on, and claims priority from JP Application Serial Number 2021-149260, filed Sep. 14, 2021, the disclosure of which is hereby incorporated by reference herein in its entirety.

BACKGROUND

1. Technical Field

The present disclosure relates to an image editing support method and an image editing support device.

2. Related Art

In interactive whiteboards, when a user performs an action of writing a diagram and so on using a pointer to a projection surface to which an image is projected, the diagram and so on are recognized as objects, and an image in which the objects are arranged is projected on the projection surface. Further, in the interactive whiteboards, it is possible to select the object having already been written using the pointer, and move the object thus selected with a drag operation using the pointer. There have been proposed a variety of technologies for supporting the movement of the object on the interactive whiteboard. As an example, there can be cited a technology disclosed in JP-A-2010-238135. In JP-A-2010-238135, there is disclosed a technology of reallocating objects including an object movement of which is instructed by the user and ocher objects so as not to overlap each other when the object designated by the user overlaps the other objects at the destination of the object designated by the user.

For example, when further writing an object C between an object A and an object B which have already been written, it is necessary to move the object A and the object B to create a blank for writing the object C. In the technology disclosed in JP-A-2010-238135, in order to create the blank for writing the object C, it is necessary to individually move each of the object A and the object B taking moving directions and moving amounts into consideration, and it is unachievable to create the blank with a simple operation.

SUMMARY

An image editing support method according to an aspect of the present disclosure includes deciding a first object at least partially overlapping a range filled with a blank in a first image in which a single first object or a plurality of first objects representing at least one of a character string and a diagram is arranged as a movement target object when an operation of designating the range is performed by a user using a pointer, and moving the movement target object to an outside of the range.

An image editing support device according to an aspect of the present disclosure is provided with a display device and a processing device. The display device displays a first image in which a single first object or a plurality of first objects representing at least one of a character string and a diagram are arranged. The processing device executes deciding the first object at least partially overlapping a range to be filled with a blank in the first image as a movement target object when an operation of designating the range is performed by a user using a pointer, and moving the movement target object to an outside of the range.

DESCRIPTION OF AN EXEMPLARY EMBODIMENT

An embodiment described hereinafter is provided with a variety of technically preferable limitations. However, the embodiment of the present disclosure is not limited to an aspect described below.

1. Embodiment

Figure 1:
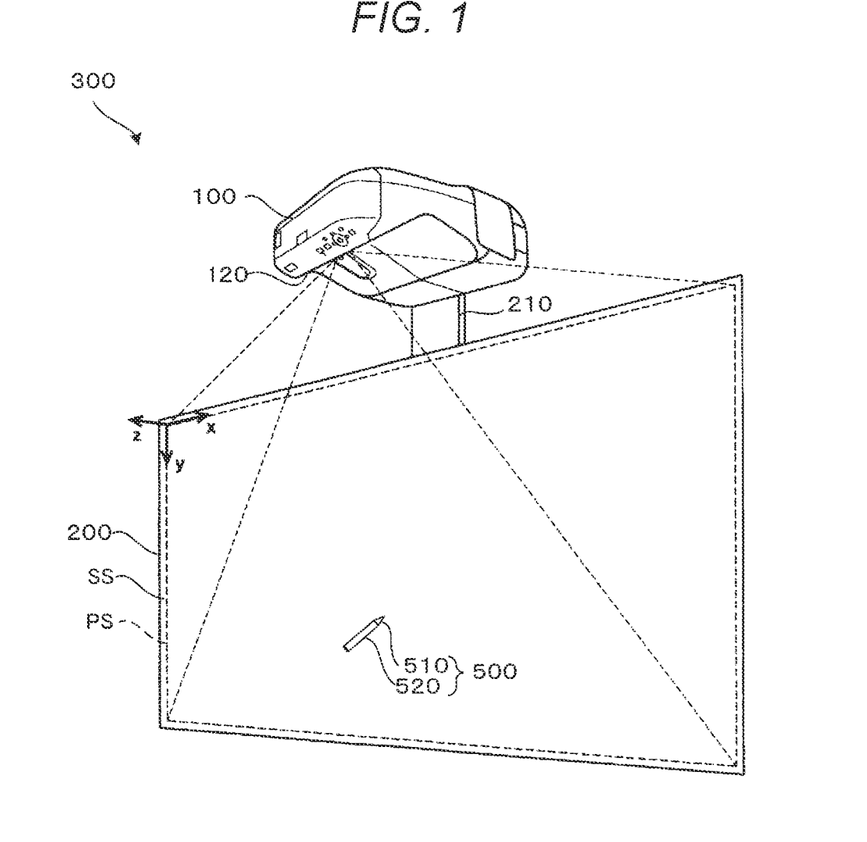
FIG. 1 is a perspective view of a projection system including a projector 100 according to an embodiment of the present disclosure.
Figure 2:
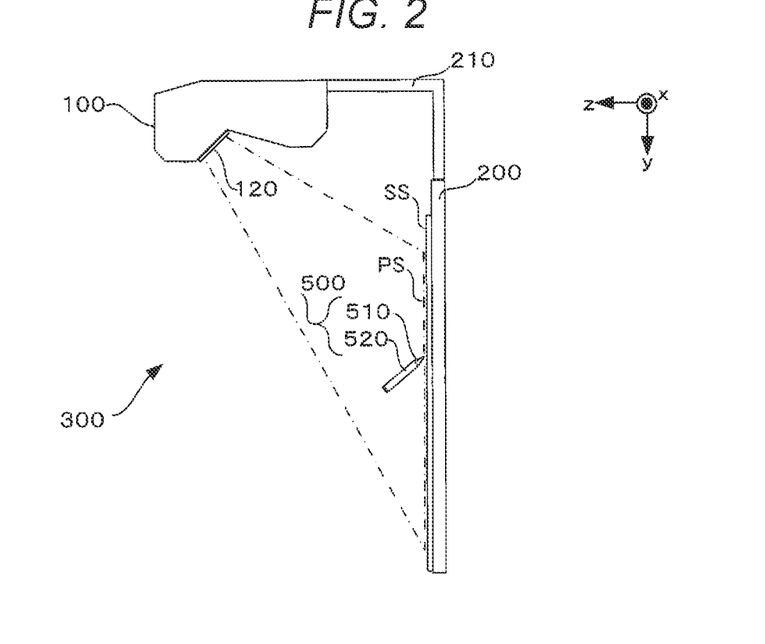
FIG. 2 is a side view of the projection system 300.

FIG. 1 a perspective view of a projection system 300 including a projector 100 as an embodiment of an image editing support device according to the present disclosure. FIG. 2 is a side view of the projection system 300. The projection system 300 functions as an interactive whiteboard. As shown in FIG. 1 and FIG. 2, the projection system 300 includes a projection plate 200 and a pointer 500 besides the projector 100.

A front surface of the projection plate 200 is used as a projection surface SS on which an image is projected by the projector 100. As shown in FIG. 1 and FIG. 2, the projector 100 is fixed in front of and vertically above the projection plate 200 with a support member 210. Although in the present embodiment, the projection plate 200 is disposed so as to erect vertically, it is possible to configure the projection system 300 by disposing the projection plate 200 so as to lie horizontally, and disposing the projector 100 vertically above the projection plate 200. As shown in FIG. 1, hereinafter, a coordinate axis in the vertical direction is referred to as a y axis, a coordinate axis along a normal line of the projection plate 200 is referred to as a z axis, and a coordinate axis perpendicular to both of the y axis and the z axis is referred to as an x axis, respectively.

The projector 100 projects a display image PS on the projection surface SS of the projection plate 200 to thereby display the display image PS on the projection surface SS. The projection surface SS means a surface of a member on which the image is projected. The pointer 500 has a tip portion 510 and a shaft 520. It is possible for the user of the projection system 300 to perform an operation of drawing an object such as a character or a diagram on the projection surface SS by gripping the shaft 520 in his or her hand, and moving the pointer 500 while making the tip portion 510 have contact with the projection surface SS so as to trace the projection surface SS. The tip portion 510 is provided with a light emitter not shown. The light emitter emits infrared light only when having contact with the projection surface SS, and does not emit the infrared light when not having contact therewith.

The projector 100 incorporates an imaging device 120. The imaging device 120 is installed with a field angle with which at least the entire area of the projection surface SS can be imaged. In the imaging device 120, there is installed a visible light cutoff filter not shown. More particularly, the visible light cutoff filter incorporated in the imaging device 120 has a property of transmitting infrared light emitted from the tip portion 510 of the pointer 500 while blocking the visible light such as light projected from the projector 100, light of an illumination of a room in which the projector 100 is installed, and natural light. The imaging device 120 takes an image represented by the light transmitted through the visible light cutoff filter. Therefore, an image of the visible light such as the illumination light, the natural light, and the light projected from the projector 100 is not taken by the imaging device 120, but an image represented by the infrared light emitted from the tip portion 510 of the pointer 500 is taken by the imaging device 120. Therefore, in the taken image by the imaging device 120, an area of the tip portion 510 of the pointer 500 emits light, but other areas do not emit light. The projector 100 detects a contact position of the pointer 500 with the projection surface SS based on the taken image by the imaging device 120.

Figure 3:
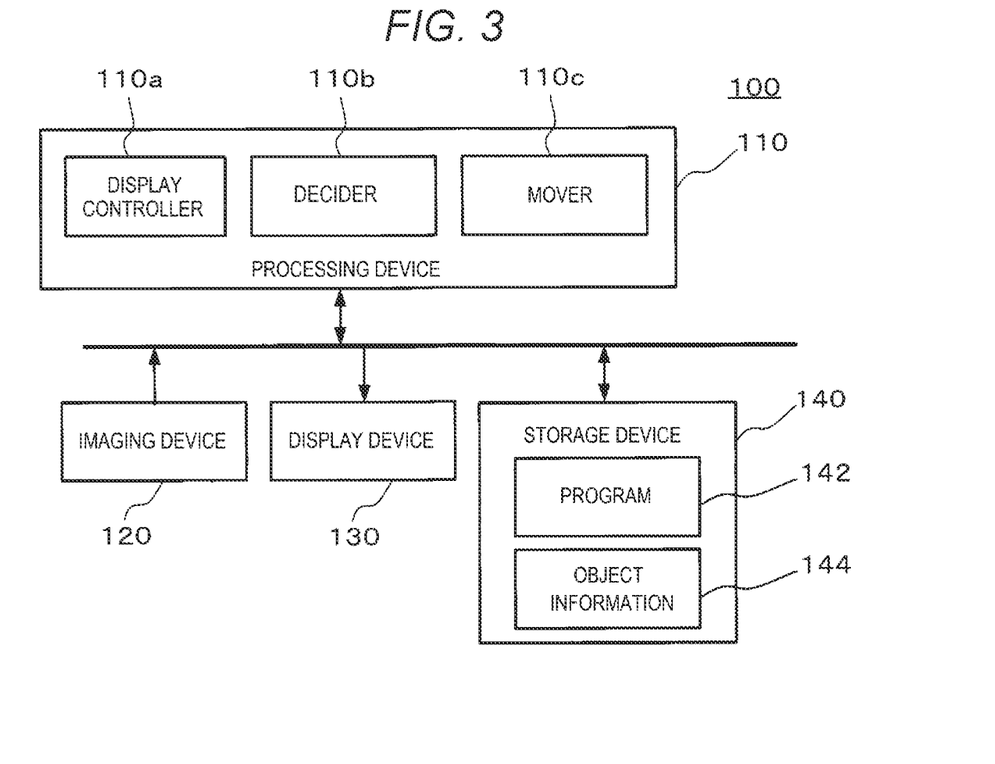
FIG. 3 is a diagram showing a configuration example of the projector 100.

FIG. 3 is a block diagram showing a configuration example of the projector 100. As shown in FIG. 3, the projector 100 includes a processing device 110, a display device 130, and a storage device 140 besides the imaging device 120. It should be noted that the projector 100 can also include an input device provided with a plurality of operators such as a numerical keypad, and a communication device for performing communication with other devices via a communication network such as a wired LAN (Local Area Network) or a wireless LAN besides the processing device 110, the imaging device 120, the display device 130, and the storage device 140. For example, the input device is a device for making the user of the projector 100 perform a variety of input operations related to an operation setting of the projector 100. The communication device is used for a reception of image data transmitted from an image supply device such as a personal computer.

The processing device 110 is configured including a processor such as a CPU (Central Processing Unit), namely a computer. The processing device 110 can be formed of a single computer, or can also be formed of a plurality of computers. The processing device 110 acts with a program 142 stored in the storage device 140 to thereby function as a center of control of the projector 100.

The imaging device 120 takes an image of the projection surface SS at specific time intervals such as several milliseconds under the control by the processing device 110. The imaging device 120 outputs the image data representing the taken image to the processing device 110 every time the imaging device 120 takes the image of the projection surface SS. Hereinafter, the image data output from the imaging device 120 to the processing device 110 is referred to as taken image data. The processing device 110 analyzes the taken image data sequentially output from the imaging device 120 to detect the contact position of the pointer 500 and a trajectory drawn using the pointer 500. The processing device 110 detects objects written by the user and writing positions of the respective objects for each of the objects based on the trajectory drawn with the pointer 500.

In the present embodiment, as a specific example of the object to be written by the user using the pointer 500, there can be cited a single character string or a plurality of character strings, a single diagram or a plurality of diagrams, or a combination of the character string and the diagram to be written by the user using the pointer 500. It should be noted that regarding a specific algorism of detecting the object and the writing position of the object from the taken image data sequentially output from the imaging device 120, there is adopted an existing technology as needed. For example, when an end point of a first trajectory representing a character string is detected, and then writing of a second trajectory representing a diagram is detected at a point at a distance longer than a predetermined threshold value from the end point, the processing device 110 judges that the first trajectory and the second trajectory each correspond to an individual object, and detects the object of the character string based on the first trajectory, and detects the object of the diagram based on the second trajectory. In contrast, when the end point of the first trajectory is detected, and then the writing of the second trajectory as a new trajectory is detected at a point at a distance shorter than the predetermined threshold value from the end point, the processing device 110 detects one object as a combination of the character string and the diagram based on the first trajectory and the second trajectory.

The display device 130 is a projection device for projecting the display image PS on the projection surface SS in accordance with the image signal provided from the processing device 110. Although the detailed illustration is omitted in FIG. 3, the display device 130 includes a projection optical system including a projection lens, a liquid crystal driver, a liquid crystal panel, and a light source section. The liquid crystal driver drives the liquid crystal panel in accordance with the image signal provided from the processing device 110 to thereby draw the image represented by the image signal on the liquid crystal panel. The light source section includes a light source such as a halogen lamp or a laser diode. The light from the light source section is modulated by the liquid crystal panel pixel by pixel, and is projected on the projection surface SS by the projection optical system.

In the present embodiment, the processing device 110 generates the image signal representing the display image PS in which the object detected by analyzing the taken image data is arranged at the writing position of the object in a background image with a single color such as white. Since the objects written by the user using the pointer 500 are arranged at the respective writing positions in the display image PS, there is realized an interactive whiteboard. It should be noted that since the visible light forming the background image is blocked by the visible light cutoff filter incorporated in the imaging device 120, there is no chance for the visible light forming the background image to affect the detection of the object. The image data representing the background image can be generated inside the projector 100, or can also be obtained from the image supply device with the data communication using a communication device.

The storage device 140 is a recording medium which can be read by the processing device 110. The storage device 140 includes, for example, a nonvolatile memory and a volatile memory. The nonvolatile memory is, for example, a ROM (Read Only Memory), an EPROM (Erasable Programmable Read Only Memory), or an EEPROM (Electrically Erasable Programmable Read. Only Memory). The volatile memory is, for example, a RAM (Random Access Memory).

In the nonvolatile memory of the storage device 140, there is stored the program 142 for making the processing device 110 execute processing conspicuously representing features of the present disclosure. Although the detailed illustration is omitted in FIG. 2, the nonvolatile memory stores a variety of types of configuration information defining the operation of the projector 100. As a specific example of the configuration information, there is cited correction information representing a keystone correction and so on to be performed on the display image PS. The volatile memory of the storage device 140 is used by the processing device 110 as a work area when executing the program 142.

Figure 4:
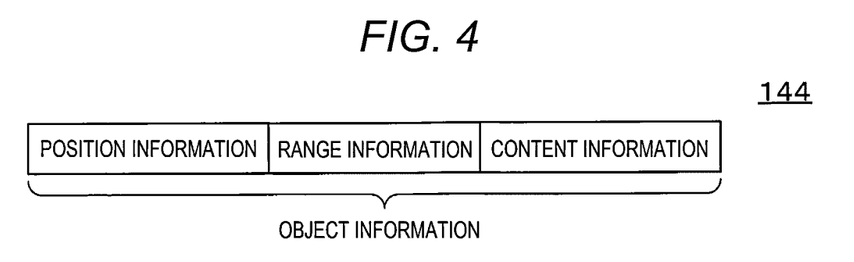
FIG. 4 is a diagram showing an example of object information 144.

Further, the volatile memory stores information to be generated in the process of making the processing device 110 execute the program 142. In the information generated in the process of making the processing device 110 execute the program 142, there is included object information 144 representing the object. The object information 144 is generated object by object. FIG. 4 is a diagram showing an example of the object information 144. As shown in FIG. 4, in the object information 144, there are included position information representing the writing position of the object, range information representing a range of the object, and content information representing a content of the object. The position information represents a coordinate of the center of the object, more specifically, a coordinate of the center of a minimum circumscribed rectangle of the object. The range information represents a size of the minimum circumscribed rectangle of the object. The content information represents an image of a character string, a diagram, or a combination of the diagram and the character string written in that rectangle. Hereinafter, the object the coordinate of the center, the range, and the content of which are represented by the object information 144 is referred to as a written object, and a rectangle zoning the range represented by the object information 144 is referred to as an extension of the written object. The written object is an example of a first object in the present disclosure.

The processing device 110 reads the program 142 out from the nonvolatile memory to the volatile memory taking powering-ON of the projector 100 as a trigger, and then starts execution of the program 142 thus read out. It should be noted that in FIG. 3, the illustration of the power supply of the projector 100 is omitted. The processing device 110 which is operating in accordance with the program 142 functions as a display controller 110*a*, a decider 110*b*, and a mover 110*c*. The display controller 110*a*, the decider 110*b*, and the mover 110*c* shown in FIG. 3 are software modules realized by making the processing device 110 operate in accordance with the program 142. The functions played respectively by the display controller 110*a*, the decider 110*b*, and the mover 110*c* are as follows.

The display controller 110*a* generates the image signal representing the display image PS based on the object information 144 stored in the volatile memory of the storage device 140, and then executes the processing of providing the image signal thus generated to the display device 130 periodically at intervals of, for example, several milliseconds. It should be noted that under the situation in which no object is written on the projection surface SS, the display controller 110*a* provides the image signal representing the background image to the display device 130. When the object written by the user is detected by analyzing the taken image data, the display controller 110*a* writes the object information. 144 representing the object thus detected in the volatile memory of the storage device 140. Thereafter, the display controller 110*a* generates the image signal representing the display image in which the written object is arranged based on the object information. 144 stored in the volatile memory of the storage device 140, and then provides the image signal thus generated to the display device 130. In other words, the display controller 110*a* is a functional block for realizing the interactive whiteboard.

Figure 5:
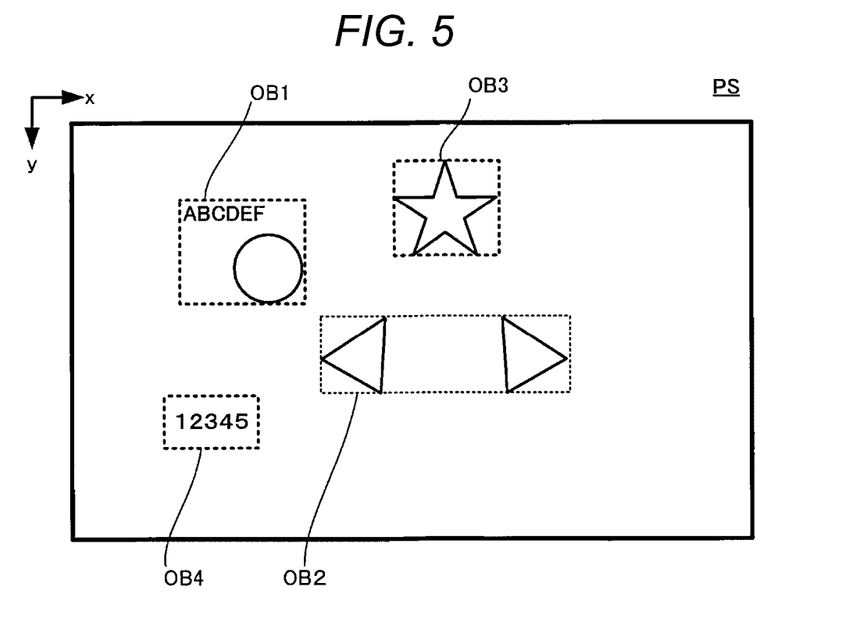
FIG. 5 is a diagram showing an example of a display image PS to be projected by the projector 100.

FIG. 5 is a diagram showing an example of the display image PS. In the display image PS shown in FIG. 5, there are arranged a written object OB1, a written object OB2, a written object. OB3, and a written object OB4. The written object OB1 is an object constituted by a character string and a circle. The written object OB2 is an object constituted by a character string and two triangles. The written object OB3 is an object formed of a star-shaped diagram. The written object OB4 is an object formed of a character string. Although the four written objects are arranged in the display image PS shown in FIG. 5, the number of the written objects arranged in the display image PS can be 1 through 3, and can also be 5 or more. In short, it is sufficient to arrange a single written object or a plurality of written objects in the display image PS. Dotted lines in FIG. 5 represent the extensions of the respective written objects. In the present embodiment, in order to clearly specify the extensions of the respective written objects, the images representing the respective rectangles drawn with the dotted lines in FIG. 5 are displayed so as to be superimposed on the display image PS.

In the present embodiment, the display controller 110*a* makes the display device 130 display the display image PS in which a single written object or a plurality of written objects are arranged to thereby receive an operation by the user designating a range filled with a blank in the display image PS using the pointer 500. By performing an operation of drawing a shape corresponding to the extension of the range filled with the blank in the display image PS using the pointer 500, it is possible for the user of the projector 100 to designate that range. The operation of designating the range filled with the blank in the display image PS is hereinafter referred to as a range designation operation. Further, the range designated by the range designation operation is referred to as an influence range. The influence range is detected by analyzing the taken image data sequentially output from the imaging device 120. When the display controller 110*a* detects the influence range, the display controller 110*a* displays the image showing the shape corresponding to the extension of that influence range so as to be superimposed on the display image PS. The image showing the shape corresponding to the extension of the influence range is an example of a second image in the present disclosure.

When the range designation operation is performed by the user using the pointer 500, the decider 110*b* decides the written object at least partially overlapping the influence range as a movement target object. The decider 110*b* refers to the object information 144 to thereby determine whether or not the written object at least partially overlaps the influence range for each of the written objects. Then, the decider 110*b* decides the written object at least partially overlapping the influence range as the movement target object. Further, the decider 110*b* decides the position of the center of the influence range as the reference position to be the reference when moving the movement target object. The center of the influence range means a geometric center of the influence range.

The mover 110c moves the movement target object to an outside of the influence range. In the present embodiment, the mover 110c moves the movement target object in a direction of getting away from the reference position along an axis decided in accordance with a shape of the extension of the influence range, and then updates the object information 144 in accordance with the movement of the movement target object. When the shape of the influence range is a circle, the mover 110c radially moves the movement target object centering on the reference position. When the shape of the influence range is a circle, the axis decided in accordance with the shape of the extension of the influence range means an axis passing through the center of the movement target object and the reference position. Further, when the shape of the influence range is a rectangle, the mover 110c moves the movement target object in a direction of getting away from the reference position along an axis parallel to a long side of the rectangle.

Figure 6:
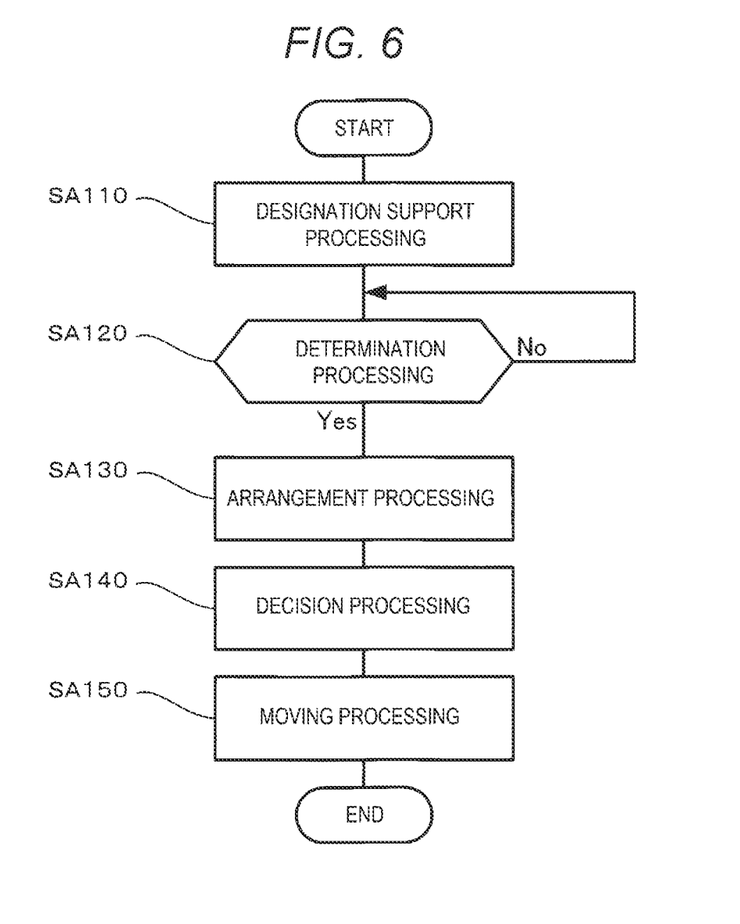
FIG. 6 is a flowchart showing a flow of an editing support method to be executed by a processing device 110 of the projector 100 in accordance with a program 142.

Further, the processing device 110 which is operating in accordance with the program 142 executes an image editing support method shown in FIG. 6. As shown in FIG. 6, the image editing support method according to the present embodiment includes designation support processing SA110, determination processing SA120, arrangement processing SA130, decision processing SA140, and moving processing SA150.

In the designation support processing SA110, the processing device 110 functions as the display controller 110a. In the designation support processing SA110, the processing device 110 makes the display device 130 display the display image PS to thereby receive the range designation operation. As described above, by performing an operation of drawing shape corresponding to the extension of the range filled with the blank in the display image PS using the pointer 500, it is possible for the user of the projector 100 to designate the influence range.

In the determination processing SA120 following the designation support processing SA110, the processing device 110 functions as the display controller 110a. In the determination processing SA120, the processing device 110 determines whether or not the range designation operation has been performed based on the taken image data. In a more detailed description, in the determination processing SA120, when a trajectory representing a circle, a rectangle, or the like is drawn using the pointer 500, and a distance between a starting point and an ending point of the trajectory is shorter than a predetermined threshold value, it is determined that the range designation operation has been performed. When the determination result in the determination processing SA120 is "No," the processing device 110 executes the determination processing SA120 once again. When the determination result in the determination processing SA120 is "Yes," the processing device 110 executes the arrangement processing SA130.

In the arrangement processing SA130, the processing device 110 functions as the display controller 110a. In the arrangement processing SA130, the processing device 110 displays the image showing the influence range so as to be superimposed on the display image PS.

In the decision processing SA140, the processing device 110 functions as the decider 110b. In the decision processing SA140, the processing device 110 decides the written object at least partially overlapping the influence range as the movement target object.

In the moving processing SA150 following the decision processing SA140, the processing device 110 functions as the mover 110c. In the moving processing SA150, the processing device 110 moves the movement target object in a direction of getting away from the reference position along an axis decided in accordance with a shape of the extension of the influence range, and then updates the object information 144 in accordance with the movement of the movement target object.

Figure 7:
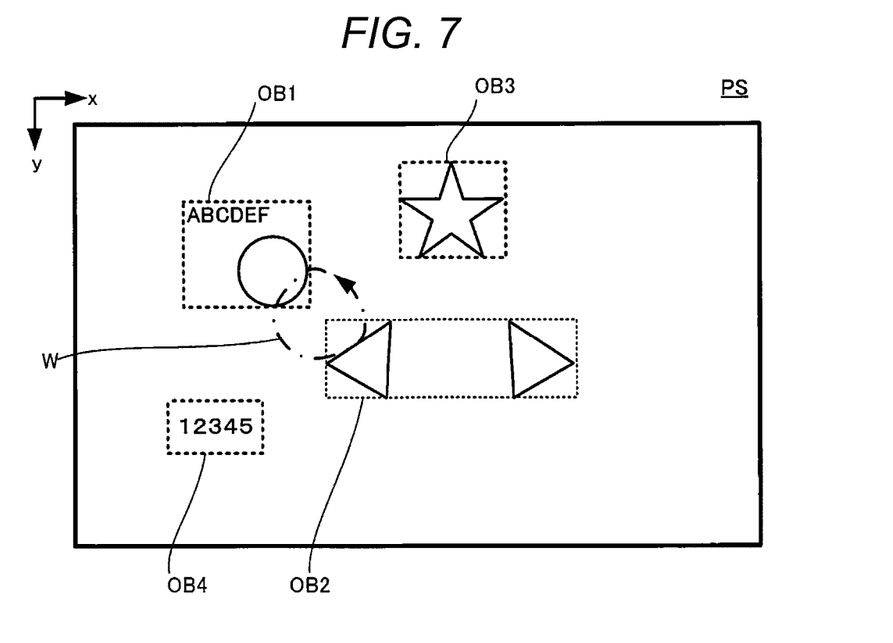
FIG. 7 is a diagram for explaining an operation example of the projector 100.
Figure 8:
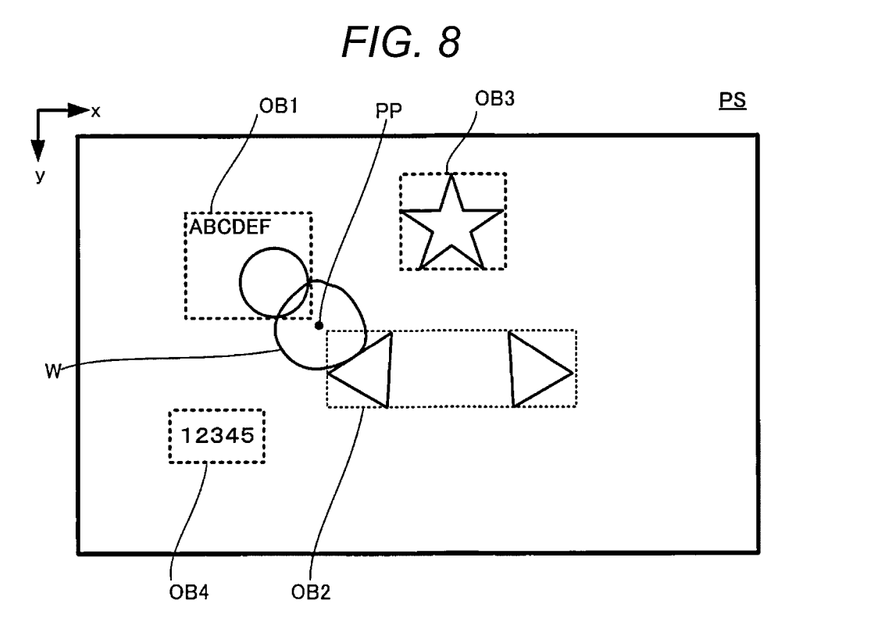
FIG. 8 is a diagram for explaining an operation example of the projector 100.

In the designation support processing SA110, when a circle is drawn as the shape corresponding to the extension of an influence range W as indicated by an arrow drawn with a dashed-dotted line in FIG. 7 under the situation in which the display image PS shown in FIG. 5 is displayed on the projection surface SS, the determination result in the determination processing SA120 becomes "Yes," and the arrangement processing SA130 is executed. As shown in FIG. 8, in the arrangement processing SA130, an image of the shape corresponding to the extension of the influence range W is displayed so as to be superimposed on the display image PS.

In the example shown in FIG. 8, although the written object OB1 and the written object OB2 both partially overlap the influence range W, none of the written object OB3 and the written object OB4 overlaps the influence range W. Therefore, in the example shown in FIG. 8, the processing device 110 decides the written object OB1 and the written object OB2 as the movement target objects in the decision processing SA140. Further, in the decision processing SA140, the processing device 110 decides the position PP of the center of the shape corresponding to the extension of the influence range W as the reference position.

Figure 9:
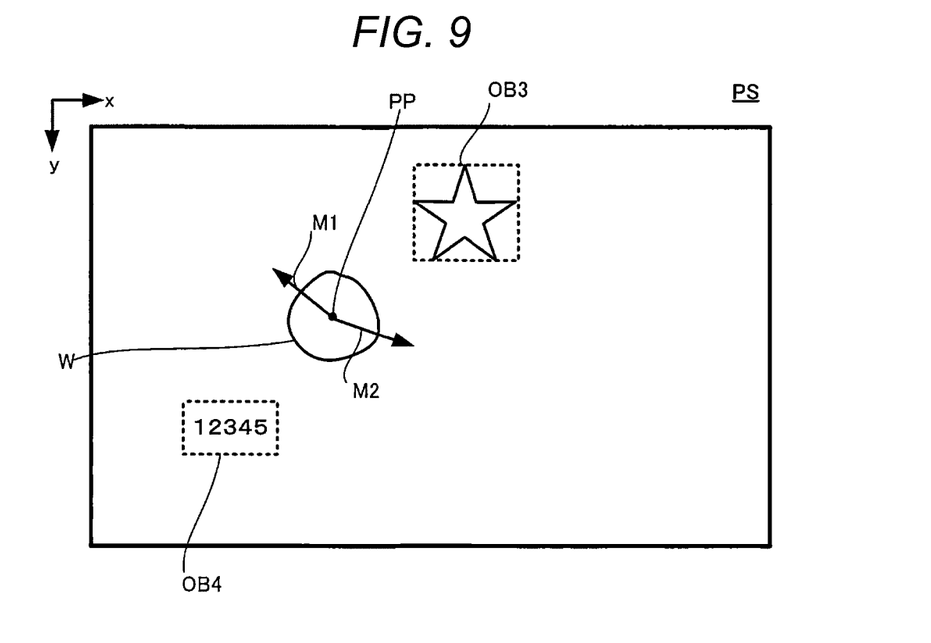
FIG. 9 is a diagram for explaining an operation example of the projector 100.

Since the shape corresponding to the extension of the influence range P designated by the user in the present operation example is a circle in the moving processing SA150, the processing device 110 radially moves the movement target object in a direction of getting away from the position PP. Specifically, the processing device 110 moves the written object OB1 in a direction indicated by the arrow M1 in FIG. 9 along an axis passing through the center of the written object OB1 and the position PP at the time point when the movement target object is decided. Further, the processing device 110 moves the written object OB2 in a direction indicated by the arrow M2 in FIG. 9 along an axis passing through the center of the written object OB2 and the position PP at the time point when the movement target object is decided. It should be noted that in FIG. 9, in order to avoid the complication of the drawings, an illustration of the written object OB1 and the written object OB2 is omitted.

Figure 10:
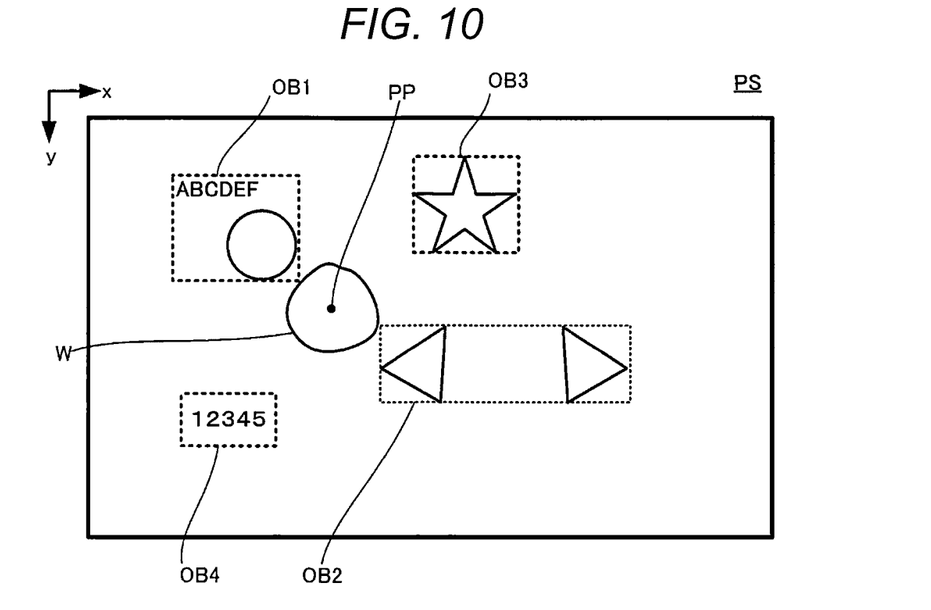
FIG. 10 is a diagram for explaining an operation example of the projector 100.

As a result of the execution of the operation described hereinabove, the display image PS is updated as shown in FIG. 10. As is obvious from the comparison between FIG. 10 and FIG. 5, in the display image PS shown in FIG. 10, the blank between the written object OB1 and the written object. OB2 is enlarged compared to the display image PS shown in FIG. 5. As described above, according to the present embodiment, by performing a simple operation of designating the range to be filled with the blank in the display image PS, it becomes possible to move the written objects at least partially overlapping the range an a lump to create the blank.

2. Modifications

The embodiment described above can be modified as follows.

(1) It is possible to make the image showing the range of the movement target object and the image showing the range of the written object other than the movement target object different in at least one of a type and a color of the line zoning the range from each other so that the discrimination between the movement target object and the written object other than the movement target object becomes clear. It should be noted that the display of the image showing the range of the written object is not essential, and can be omitted.

(2) When the distance between the movement target object and the other written object becomes shorter than the threshold value determined in advance by moving the movement target object, the processing of moving the other written object together with the movement target object can be executed. Specifically, when the distance between the movement target object and the other written object become shorter than the predetermined threshold value by moving the movement target object, the processing device 110 merges the movement target object and the other written object described above into one object. For example, the processing device 110 defines a minimum rectangle including the movement target object and the other written object described above as the minimum range of the merged object described above, and at the same time, defines the center of the rectangle as the center of the merged object. Thereafter, the processing device 110 continues the moving Processing SA150 taking the merged object as a new movement target object.

(3) The display of the image showing the influence range is not essential, and can be omitted. In other words, the arrangement processing SA130 in FIG. 6 is not essential processing, and can be omitted. Since the designation support processing SA110 and the determination processing SA120 in FIG. 6 are common processing in the interactive projectors, it is sufficient for the editing support method according to the present disclosure to include at least the decision processing SA140 and the moving processing SA150.

(4) The display device 130 in the embodiment described above is a projection device for projecting an image on the projection plate 200. However, the display device 130 can be a liquid crystal display or the like. In short, it is sufficient for the display device 130 to be a device of displaying the display image PS in which a single written object or a plurality of written objects representing at least one of a character string and a diagram are arranged.

(5) The display controller 110a, the decider 110b, and the mover 110c in the embodiment described above are the software modules. Any one, some, or all of the display controller 110a, the decider 110b, and the mover 110c can each be a hardware module such as an ASIC (Application Specific integrated Circuit). Even when any one of the display controller 1100, the decider 110b, and the mover 110c is a hardware module, or some or all of the display controller 110a, the decider 110b, and the mover 110c are hardware modules, the same advantages as in the embodiment described above are exerted.

(6) The program 142 can be manufactured alone, or can be provided with or without consideration. As a specific aspect when providing the program 142, there can be cited an aspect of writing the program. 142 in a computer-readable recording medium such as a flash ROM to provide the recording medium, and an aspect of providing the program 142 by downloading the program 142 via a telecommunication line such as the Internet. By making a general computer operate with the program 142 provided in these aspects, it becomes possible to make the computer function as the editing support device according to the present disclosure.

3. Aspects Figured Out from at Least One of Embodiment and Modified Examples

The present disclosure is not limited to the embodiment and the modified examples described above, but can be implemented in a variety of aspects within the scope or the spirit of the present disclosure. For example, the present disclosure can also be implemented in the following aspects. The technical features in the embodiment described above corresponding to the technical features in each of the aspects described below can arbitrarily be replaced or combined in order to solve a part or the whole of the problem of the present disclosure, or to achieve some or all of the advantages of the present disclosure. Further, the technical feature can arbitrarily be eliminated unless described in the present specification as an essential element.

The image editing support method according to an aspect of the present disclosure includes the decision processing SA140, and the moving processing SA150. The decision processing SA140 is the processing of deciding the written object at least partially overlapping the range filled with the blank in the display image PS in which a single written object or a plurality of written objects representing at least one of a character string and a diagram are arranged as the movement target object when the operation of designating that range has been performed by the user using the pointer 500. The written object is an example of the first object in the present disclosure. The display image PS is an example of a first image in the present disclosure. The moving processing SA150 is the processing of moving the movement target object to an outside of the range. According to the image editing support method of the present aspect, when the operation of designating the range to be filled with the blank has been performed, the movement target objects are decided, and the movement target objects can be moved in a lump. Therefore, according to the image editing support method according to the present disclosure, by performing a simple operation on the display image PS in which a single written object or a plurality of written objects are arranged, it becomes possible to create the blank having a desired size in the display image PS.

The image editing support method according to a more preferable aspect can include the step of displaying a range image showing the range so as to be superimposed on the display image PS. The range image is an example of a second image in the present disclosure. According to the present aspect, it becomes possible to make the user figure out the blank range to be created by moving the movement target object in advance of the movement of the movement target object.

The operation of designating the range in the image editing support method according to a more preferable aspect can be an operation of drawing the shape corresponding to the range so as to be superimposed on the display image PS. The moving processing SA150 in this aspect can be the step of moving the movement target object in a direction of getting away from the center of the range along the axis decided in accordance with the shape drawn by the operation of designating the range. According to the present aspect, it becomes possible to designate the moving direction of the movement target object by the operation of drawing the shape corresponding to the blank range.

Further, the image editing support device according to an aspect of the present disclosure is provided with the display device 130 for displaying the display image PS in which the written object representing at least one of a character string and a diagram is arranged, and the processing device 110.

The processing device 110 executes the decision processing SA140, and the moving processing SA150 described above. According to the image editing support device of the present aspect, when the operation of designating the range to be filled with the blank in the display image PS has been performed by the user using the pointer 500, it is possible to move the movement target objects in a lump. Therefore, according to the present aspect, by performing a simple operation on the display image PS in which a single written object or a plurality of written objects are arranged using the pointer 500, it becomes possible to create the blank having a desired size in the display image PS.

What is claimed is:

1. An image editing support method comprising:
    determining, out of at least one first object representing at least one of a character and a diagram, a target object which is a first object at least partially overlapping a range to be filled with a blank in a first image, the first image being an image in which the at least one first object is arranged, when an operation of designating the range is performed using a pointer, wherein the operation of designating the range is an operation of drawing a shape corresponding to the range on the first image, wherein the drawing of the shape is received based on a drawing action of the pointer; and
    moving the target object to an outside of the range in a direction of getting away from a center of the range along an axis determined in accordance with the shape, wherein the axis passes through a center of the target object.

2. The image editing support method according to claim 1, further comprising:
    displaying a second image representing the range, the second image being superimposed on the first image.

3. An image editing support device comprising:
    a display device which displays a first image in which at least one first object representing at least one of a character and a diagram is arranged; and
    at least one processing device programmed to execute
        determining, out of the at least one first object, a target object which is a first object at least partially overlapping a range to be filled with a blank in the first image when an operation of designating the range is performed using a pointer, wherein the operation of designating the range is an operation of drawing a shape corresponding to the range on the first image, wherein the drawing of the shape is received based on a drawing action of the pointer and
        moving the target object to an outside of the range, in a direction of getting away from a center of the range along an axis determined in accordance with the shape, wherein the axis passes through a center of the target object.

* * * * *